United States Patent [19]
Bows et al.

[11] Patent Number: 5,747,086
[45] Date of Patent: May 5, 1998

[54] METHOD OF COOKING A FOOD PRODUCT USING A MODE FILTERING STRUCTURE

[75] Inventors: John Richard Bows, Wellingsborough; Renoo Avinash Blindt, Northants; Robert Hurling, Bedford; James Thomas Mullin, Northants, all of Great Britain

[73] Assignee: Unilever Patent Holdings B.V., Vlaardingen, Netherlands

[21] Appl. No.: 665,641

[22] Filed: Jun. 18, 1996

Related U.S. Application Data

[63] Continuation of Ser. No. 309,498, Sep. 23, 1994, abandoned.

[30] Foreign Application Priority Data

Sep. 24, 1993 [EP] European Pat. Off. ............ 93307567

[51] Int. Cl.⁶ ................................................ A23L 1/01
[52] U.S. Cl. .......................... 426/234; 426/90; 426/92; 426/107; 426/241; 426/242; 426/243; 426/412; 219/728; 219/745
[58] Field of Search ........................... 426/90, 92, 107, 426/241, 243, 234, 412, 242; 219/728, 730, 732, 734, 745

[56] References Cited

U.S. PATENT DOCUMENTS

| | | | |
|---|---|---|---|
| 3,316,380 | 4/1967 | Ponsing | 219/745 X |
| 3,531,298 | 9/1970 | Donahue | 426/90 |
| 3,946,188 | 3/1976 | Derby | 219/728 |
| 4,230,924 | 10/1980 | Brastad et al. | 426/234 X |
| 4,258,086 | 3/1981 | Beall | 219/730 X |
| 4,518,618 | 5/1985 | Hsia et al. | 426/243 X |
| 4,626,641 | 12/1986 | Brown | 426/243 X |
| 4,656,325 | 4/1987 | Keefer | 426/243 X |
| 4,786,773 | 11/1988 | Keefer | 426/243 X |
| 4,814,568 | 3/1989 | Keefer | 426/243 X |
| 4,831,224 | 5/1989 | Keefer | 426/243 X |
| 4,841,112 | 6/1989 | Peleg | 426/243 X |
| 4,866,234 | 9/1989 | Keefer | 426/234 X |
| 4,888,459 | 12/1989 | Keefer | 426/234 X |
| 4,927,991 | 5/1990 | Wendt et al. | 426/243 X |
| 5,006,648 | 4/1991 | Wendt et al. | 219/730 X |
| 5,075,526 | 12/1991 | Sklenak et al. | 426/243 X |
| 5,124,519 | 6/1992 | Roy et al. | 219/730 X |
| 5,185,506 | 2/1993 | Walters | 426/243 X |
| 5,220,143 | 6/1993 | Kemske et al. | 426/243 X |
| 5,254,821 | 10/1993 | Walters | 426/243 X |
| 5,260,537 | 11/1993 | Beckett | 426/243 X |
| 5,310,977 | 5/1994 | Stenkamp et al. | 426/243 X |
| 5,519,196 | 5/1996 | Keefer et al. | 426/107 X |

FOREIGN PATENT DOCUMENTS

| | | | |
|---|---|---|---|
| 0246041 | 11/1987 | European Pat. Off. | |
| 0382399 | 8/1990 | European Pat. Off. | 219/728 |
| 9203357 | 3/1992 | WIPO | 219/728 |
| 9203358 | 3/1992 | WIPO | 219/728 |
| 93 06752 | 4/1993 | WIPO | |

OTHER PUBLICATIONS

Kulp et al., Batters and Breadings in Food Processing. American Association of Cereal Chemists, Inc., St. Paul, Minnesota, USA, pp. 144–145.

*Primary Examiner*—Milton Cano
*Attorney, Agent, or Firm*—Cushman Darby & Cushman Intellectual Property Group of Pillsbury Madison & Sutro LLP

[57] ABSTRACT

The present invention provides a microwaveable food product composite containing a coating food product and a mode filtering structure wherein the food product has a crumb coating having an average crumb size of greater than 1.5 mm and an air gap of from 1 to 6 mm between the food product and the mode filtering structure such that the electric field strength generated within the mode filtering structure, when used in a commercially available microwave oven, is greater than 20 kV/m, but below the breakdown voltage of air. Such composite products are useful in enhancing the heating of the surface layer of the coated food product by a microwave energy.

5 Claims, 2 Drawing Sheets

METHOD OF COOKING A FOOD PRODUCT USING A MODE FILTERING STRUCTURE

This is a continuation of application Ser. No. 08/309,498, filed on Sep. 23, 1994, now abandoned.

TECHNICAL FIELD OF THE INVENTION

The invention relates to a microwaveable food product composite comprising a coated food product and a mode filtering structure. Such composite products provide a method of enhancing the heating of the surface layer of the coated food product by microwave energy.

BACKGROUND AND PRIOR ART

Conventional microwave cooking or heating of coated food products does not provide effective browning or crisping of the food coating. In order for the coating to be suitably crispened the surface coating is required to reach a higher temperature than the bulk of the food. For this reason, a conventional convection oven set at a relatively high temperature or frying in hot oil has been the traditional method of heating such food products.

It is clearly desirable to be able to heat such products in a microwave oven. The conventional method of trying to meet this need in microwave cooking has been by means of devices known as susceptors. A susceptor is a device that incorporates lossy material ie, material that absorbs microwave energy to become heated. The susceptor is placed close to the surface layer to be browned or crispened so that heat in the susceptor is transferred by conduction and radiation to this surface layer. This process necessarily requires the temperature of the susceptor to be higher than that of the surface layer in order for the heat to flow into such layer. It has been found that there are practical disadvantages in heating the susceptor to the necessary high temperatures. There is always the risk of overheating and of breakdown of the material of the susceptor.

In contrast to the concept of using a susceptor to heat a surface layer of a food article, either directly by a wrapping, or indirectly through a pre-heated dish, EP 382 399 (Alcan International Ltd) provides an arrangement in which the surface layer of the article to be heated as well as its main portion beneath the surface layer continue to be heated dielectrically, ie by the microwave energy, without first converting such energy into heat in a susceptor. The microwave energy field is so altered that the dielectric heating effect within the surface layer is enhanced relative to the dielectric heating effect in the main portion of the article above that which could be obtained in typical conventional microwave ovens. As a result the surface layer reaches a higher temperature. The enhanced heating effect within the surface layer is achieved by means of a so-called mode-filtering structure that causes the microwave energy to enter the food product in the form of cut-off propagation thus causing the heating effect to be concentrated at the food product surface adjacent to the mode-filtering structure.

However, we have shown that use of a mode-filtering structure as disclosed by EP 382 399 is not sufficient to provide crispy coated food products when heated in a microwave. We have discovered that it is essential to provide a combination of necessary physical properties of the crumb and packaging requirements in order to obtain the desired crisp coated food products.

DISCLOSURE OF THE INVENTION

Accordingly the present invention relates to a microwaveable food product composite of a coated food product and a mode filtering structure characterised in that:

(a) the food product has a crumb coating having an average crumb size of greater than 1.5 mm;

(b) there is an air gap of from 1 to 6 mm between the food product and the mode filtering structure; and (c) the electric field strength generated within the mode filtering structure when used in a commercially available microwave oven is greater than 20 kV/m but below the breakdown of voltage of air.

Furthermore, the present invention relates to a method of enhancing the heating of a surface crumb layer of a coated food product by microwave energy comprising:

(a) coating the food with a crumb coating having an average crumb size of greater than 1.5 mm;

(b) packaging the food product in packaging which includes a mode filtering structure wherein there is an air gap of from 1 to 6 mm between the food product and the mode filtering structure; and (c) the electric field strength generated within the mode filtering structure in a commercially available microwave oven is greater than 20 kV/m but below the breakdown of voltage of air.

Crumb Properties

In order to obtain the required level of crispness, the crumb used to coat the food product must have an average particle size of greater than 1.5 mm and preferably an average particle size of equal to or greater than 2 mm.

Furthermore it has been observed that a crumb composition comprising electrolyte has advantageous crispness properties. It is therefore a preferred feature of the invention that the crumb composition includes electrolyte.

Suitable electrolytes include sodium chloride, potassium chloride, calcium chloride, lactose and fructose. Preferably the electrolyte is potassium chloride.

Packaging Requirements

In order to obtain the required level of crispness it is essential that the packaging used includes a mode-filtering structure as disclosed in EP 382 399. Furthermore it is essential that the food product and mode-filtering structure are separated by an air gap of from 1 to 6 mm, preferably from 3 mm to 6 mm.

The term "mode-filtering" is employed to refer to accentuation of the transmission of higher order modes while reflecting fundamental modes.

The mode-filtering structure is described fully in EP 382 399. It consists of a sheet of microwave transparent material provided with substantially non-absorptive conductive material defining either an island-aperture array or an array of annuli defining apertures, the dimensions of the annuli or of the gaps between the islands and the apertures being such as to achieve the desired absorption profile.

The apertures will be of such dimensions that, at the frequency of the microwave energy and with the sheet located adjacent the surface layer of the article to be heated, the modes of energy that propagate through the apertures will be in cut-off in the surface layer.

Such modes may or may not be in cut-off in the main portion (bulk) of the article lying beneath the surface layer.

The mode-filtering structure can be located on a separate sheet of microwave-transparent material, or it can be embodied in a container for the article. In the latter case, small holes for venting steam and/or for draining liquids such as fat can be provided in the container structure.

The term "container" as used herein embraces all manner of elements or devices including flat sheets, laminar, pouches, pans, lidded containers, that at least partially enclose, contain, hold, support or are supported by, the foodstuff or other material during heating in a microwave oven.

The islands and apertures of the mode-filter may assume a number of geometries among which are the following:

(a) polygonal (including polygonal with rounded apices) eg triangular, rectangular, pentagonal, hexagonal.

(b) round or elliptical (including epitrochoidal, multifoil and similar variants).

(c) conformal (not necessarily definable in terms of simple geometric shapes) having a geometric resemblance to the shape of the food and/or container and being intended to promote the propagation of higher modes within the foods.

(d) non-conformal and/or non-uniform in gap width.

(e) with apertured islands.

To conform better with the shape of food articles, the overall shape of a mode-filter may be curved or corrugate, for example, rather than planar.

A plurality of mode-filters may be provided within the packaging to provide simultaneous treatment of multiple food surfaces, for example.

The islands of the mode-filter may be made of any suitable microwave energy conducting material or microwave energy conducting composite, for example metal, preferably aluminium.

The apertures of the mode-filter may be made of any suitable dielectric material, especially preferred is air.

The associated electric field strength (E) generated within the mode-filtering structure when used in a commercially available microwave oven must be greater than 20 kV/m but below the breakdown voltage of air. Preferably the electric field strength is from 20 to 30 kV/m, most preferably 30kV/m. The electric field strength may be altered by altering the arrangement of islands and apertures of the mode-filter. A preferred arrangement is shown in FIG. 2 wherein the islands are in a stepped arrangement.

IN THE ACCOMPANYING DRAWINGS

The embodiment of the invention as illustrated by the drawings is a combination of the physical properties of the foodstuff (6) and packaging requirements which incorporate a mode-filtering structure (1 and 8).

The mode-filtering structure (1 and 8) is formed with a plurality of apertures (5) spaced apart from each other and from the outer periphery by a plurality of electrically conductive islands (4) of interconnected perpendicular and parallel rectangular segments. This is clearly shown in FIG. 2.

Figure 1:
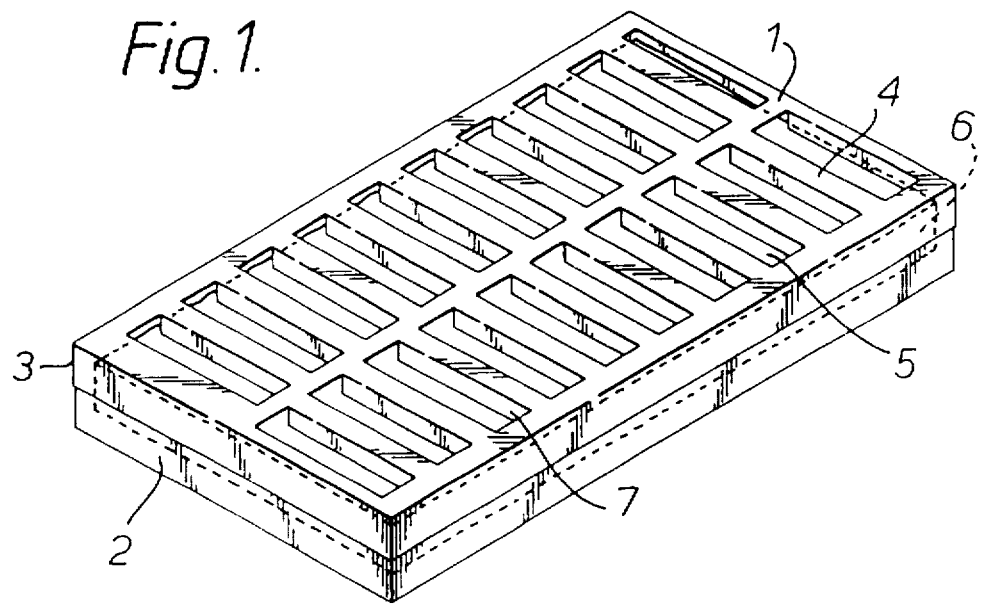
FIG. 1 is a perspective view of a microwave heating container, for holding a body of foodstuff, incorporating an embodiment of the mode-filtering structure according to the invention.
Figure 2:
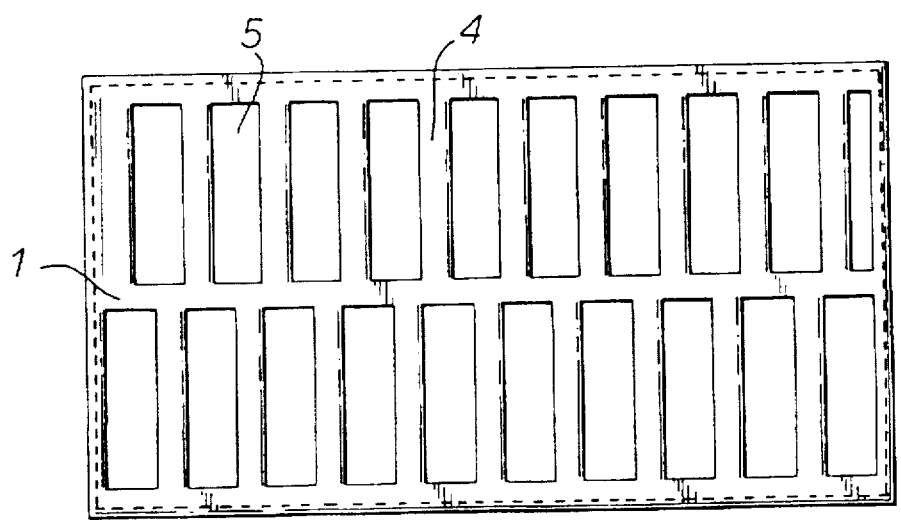
FIG. 2 is a top plan view of an example of a mode-filtering structure having a preferred arrangement of islands and apertures.

The mode-filtering structure as shown in FIG. 2 is incorporated into the packaging for the foodstuff as illustrated by FIG. 1. Mode filtering structures are preferably located in the top and base of the packaging (1 and 8 respectively). FIG. 1 shows a microwave heating container having a generally rectangular upwardly opening tray (9) with a bottom (10) and side walls (2) for receiving and holding a body of foodstuff (6) to be heated. A moulded lid (3) transparent to microwave energy and having a downwardly extending portion (11) and a flat top or sheet portion (12) covers the upward opening of the tray, the downwardly extending portion seating on the tray rim. The foodstuff is spaced from both the lid and base of the packaging by supports (7). The mode-filters (1 and 8) are mounted on the flat surface of the lid top (12) and base on bottom (10).

Figure 3:
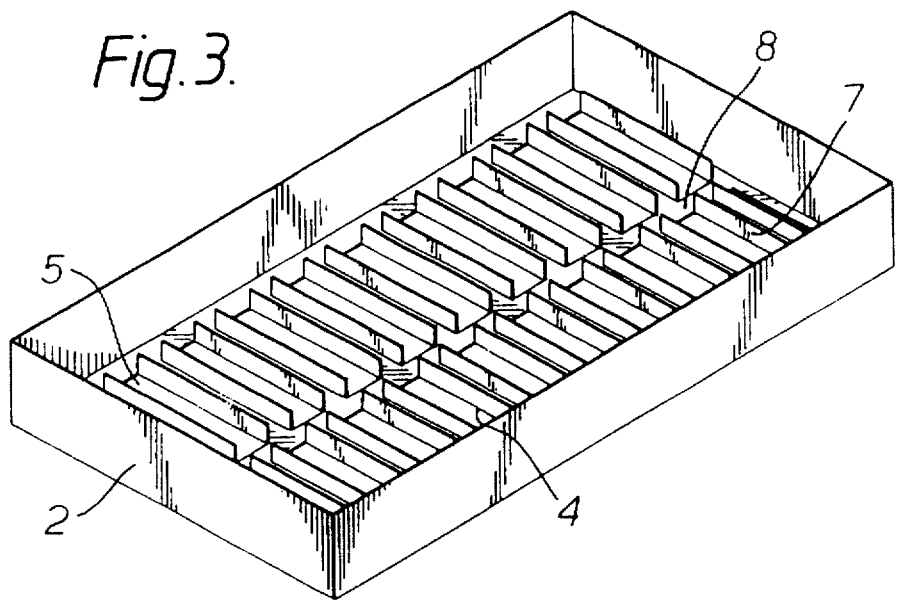
FIG. 3 is a perspective view of the base of a microwave heating container as shown in FIG. 1.

FIG. 3 shows the incorporation of the mode-filtering structure as shown in FIG. 2 into the base of the packaging for the foodstuff. This Figure clearly shows the supports (7) used to space the foodstuff from the lower mode-filtering structure (8) mounted on the flat surface of the base of the packaging.

Figure 4:
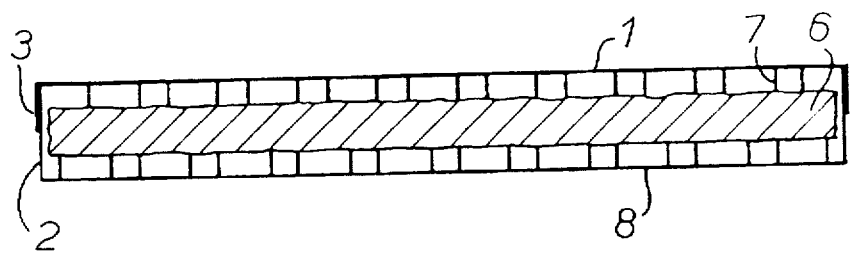
FIG. 4 is a sectional view of the microwave heating container for holding a body of foodstuff as shown in FIG. 1.
Figure 5:
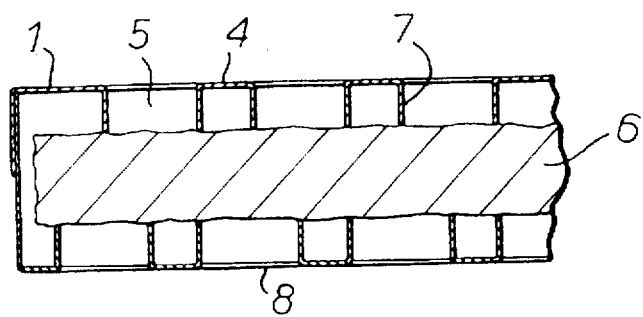
FIG. 5 is an enlarged fragment of the sectional view shown in FIG. 4.

FIGS. 4 and 5 show a sectional view of a microwave heating container for holding a body of foodstuff as shown in FIG. 1. The spacing of the foodstuff (6) from the upper (1) and lower (8) mode-filtering structure via supports (7) is clearly illustrated.

EXAMPLES

Determination Of Suitable Electric Field To Obtain Crisp Crumb

Example 1–5

Comparative Examples A and B

For Examples 1 to 5 and Comparative Example A, the commercially available product "Cod Steaks with Crisp Crumb" from Birds Eye Wall's (UK) were studied, having a crumb size of approx 2 mm or greater. In Comparative Example B a commercially available conventional fish finger was studied having a coating of approximately 0.5 mm crumb.

The coated fish portions were used to provide a 72×34 mm sample which was placed in a Gerling 3 kW 2450 MHz Waveguide System (WG 284) (Model GL 102 A with a GL 808-1 control). A Luxton electric field probe was used to measure the electric field adjacent to the fish portion. Each product was exposed to the electric field for a length of time equal to 60 kJ $P_F(W)$ where $P_F$ equal the Forward Power in Watts.

The crispness of the crumb was determined by a trained sensory panel. Results are shown in Table 1.

TABLE 1

| Example | Electric Field (kV/m) | Crumb Size (mm) | Crispness |
|---|---|---|---|
| 1 | 20 | 2 | dry, crisp crumb |
| 2 | 23 | 2 | dry, crisp crumb |
| 3 | 27 | 2 | dry, crisp crumb |
| 4 | 30 | 2 | dry, crisp crumb |
| 5 | 33 | 2 | dry, crisp crumb |
| A | 13 | 2 | wet, moist crumb |
| B | 30 | 0.5 | wet, moist crumb |

These results illustrate that in order to obtain a crisp crumb an electric field of greater than or equal to 20 kV/m is required and a crumb size of approximately 2 mm. Such an electric field requirement can be achieved in a conventional microwave oven by employment of a Mode Filter Structure as defined by the invention.

Example 6

A commercially available fish portion having a 2 mm crumb coating was used as described for Example 1. This was placed in packaging comprising a mode filter structure as illustrated in FIG. 1. There was an air gap of 5 mm between the coated fish portion and the mode filter structure. The coating of the fish portion was dry and crisp after heating for 3 minutes in a Sairem laboratory oven set at 600 W. The electric field generated was 28 kV/m.

We claim:

1. A method of enhancing the heating and cooking of a crumb-coated food product by microwave energy comprising the steps of:

packaging the food product in a mode filtering structure comprising a base mode filtering member defining an upward opening tray with a bottom and sidewalls for receiving and holding the food product to be heated, and a lid mode filtering member with a downwardly extending portion and a top which covers the upward opening of the tray, each of the base mode filtering member and lid mode filtering member being provided with a plurality of supports so that the food is spaced from both the base and the lid by an air gap of from 1 to 6 mm between the surface of the food product and the mode filtering structure; and placing the package of food product in a microwave oven and generating an electric field strength greater that 20 kV/m, but below the breakdown voltage of air, to heat the food product and obtain a crisp, crumb-coated cooked food product.

2. The method according to claim 1 wherein the food product has a crumb coating having an average crumb size of equal to or greater than 2 mm.

3. The method according to claim 1 wherein the mode filtering structure comprises electrically conductive islands of interconnected perpendicular and parallel rectangular segments.

4. The method according to claim 1 wherein the air gap between the food product and the mode filtering structure is from 3 to 6 mm.

5. The method according to claim 1 wherein the electric field strength generated within the mode filtering structure is from 20 to 30 kV/m.

* * * * *